United States Patent [19]

Rebhan

[11] Patent Number: 5,140,600
[45] Date of Patent: Aug. 18, 1992

[54] METHOD OF CONTROLLING THE TOTAL ENERGY AMOUNT OF A PLURALITY OF LASER PULSES

[75] Inventor: Ulrich Rebhan, Göttingen, Fed. Rep. of Germany

[73] Assignee: Lambda Physik Gesellschaft zur Herstellung von Lasern mbH, Fed. Rep. of Germany

[21] Appl. No.: 680,385

[22] Filed: Apr. 4, 1991

[30] Foreign Application Priority Data

Nov. 30, 1990 [DE] Fed. Rep. of Germany ....... 4037901

[51] Int. Cl.⁵ ............................................. H01S 3/10
[52] U.S. Cl. ........................................ 372/25; 372/29; 372/20; 372/98
[58] Field of Search ............... 372/25, 98, 29, 33, 372/9, 18, 20, 30

[56] References Cited

U.S. PATENT DOCUMENTS

| | | | |
|---|---|---|---|
| 3,829,791 | 8/1974 | Schwartz | 372/25 |
| 4,530,098 | 7/1985 | Karaki | 372/9 |
| 4,696,009 | 9/1987 | Süse et al. | 372/25 |
| 4,702,245 | 10/1987 | Schröder et al. | 372/25 |

FOREIGN PATENT DOCUMENTS

| | | |
|---|---|---|
| 164751 | 12/1985 | European Pat. Off. . |
| 2900390 | 1/1979 | Fed. Rep. of Germany . |
| 3243470 | 11/1982 | Fed. Rep. of Germany . |

Primary Examiner—Léon Scott, Jr.
Attorney, Agent, or Firm—Brumbaugh, Graves, Donohue & Raymond

[57] ABSTRACT

A method of controlling the total energy amount of a plurality of laser pulses in which the accumulation of the energy amounts of the individual pulses is measured with an energy measuring device and the laser pulses are interrupted when a dose desired value of the accumulated energy amounts is reached, provides that for increasing the accuracy of the energy dose achieved several laser pulses before reaching the dose desired value the energy amount of the individual laser pulses is reduced.

5 Claims, 2 Drawing Sheets

METHOD OF CONTROLLING THE TOTAL ENERGY AMOUNT OF A PLURALITY OF LASER PULSES

The invention relates to a method of controlling the total energy amount of a plurality of laser pulses in which the accumulation of the energy amounts of the individual laser pulses is measured with an energy measuring device and the laser pulses are interrupted when a dose desired value is reached by accumulation of the energy amounts.

In a great number of scientific, technical and industrial applications of pulsed lasers it is necessary to exactly set (control) the total energy amount of a large number of laser pulses. Once the accumulated total energy amount of the plurality of laser pulses has reached a desired value, referred to as dose reference or desired value, the laser action is interrupted. Such a dose control is for example important in microlithography by means of narrow-band excimer laser. In for example photoresist exposure as well the accumulated total energy amount (dose) has to be exactly set.

Exact setting of the dose is not a trivial matter when the energy of the laser pulses is not exactly constant from pulse to pulse. This is the case with many pulsed laser types, for example excimer lasers, dye lasers, $CO_2$ lasers, YAG lasers, etc.

If a pulsed laser furnishes per laser pulse a typical individual pulse energy E (which as stated above may be subject to statistical fluctuations from pulse to pulse) the accumulated total energy (also called dose) for all the pulses is defined by $$D = \sum_{n=1}^{n=N} E_n \quad (1)$$

$E_n$ is the energy of the nth pulse and a total of N laser pulses is present.

If a mean value E is assumed for the mean individual pulse energy then the dose is represented by $$D = N \times E \quad (2)$$

Because of the statistical fluctuations of the individual pulse energy values, in practice the laser pulse N for reaching a desired dose reference value $D_S$ will not be constant.

The absolute accuracy with which the dose desired value $D_S$ can be achieved is defined by $$\Delta D = |D_s - D| \approx E \quad (3)$$

This means that the desired dose reference value $D_S$ can be accurately set substantially to within the energy of a single laser pulse.

The relative error of the energy dose control is $$\frac{\Delta D}{D} \approx \frac{1}{N} \quad (4)$$

Thus, the relative accuracy with which the dose desired value $D_S$ can be reached can be set by means of the total number N of the laser pulses. This is true of the prior art.

If in an industrial application the throughput is to be optimized it is usually desirable to minimize the number N of the laser pulses used. However, with the control of the dose described above this leads to losses in accuracy of the dose.

The invention is based on the problem of providing a method of controlling the total energy amount of a plurality of laser pulses with which simple means a predetermined dose desired value can be achieved with high accuracy and a low number of laser pulses.

Acording to the invention this problem is solved in a method of controlling the total energy amount of a plurality of laser pulses of the type set forth at the beginning in that several laser pulses before reaching the desired dose reference value the energy amount of the individual laser pulses is reduced.

Thus, according to the invention until a relatively high percentage of the dose desired value $D_S$ is reached the operation is carried out with the full laser pulse energy E. Then, before reaching the dose desired value the operation goes on with reduced pulse energy $\alpha E$ ($\alpha < 1$) until the dose desired value is reached.

Hereinafter, the method according to the invention will be compared with a conventional method of the type described above in the Table:

|  | Method accd. the prior art | Method with variable pulse energy |
|---|---|---|
| dose desired value | $D_S$ | $D_S$ |
| accumulated dose | $D = N \times E$ | $D = (N - n) \times E + \left(n \frac{1}{\alpha}\right)(\alpha E)$ |
| absolute error | $\Delta D \approx E$ | $\Delta D \approx (\alpha E)$ |
| relative error | $\Delta D/D \approx 1/N$ | $\Delta D/D \approx \alpha/N$ |

If $\alpha$ is selected equal to 0.1 and about 20 laser pulses are required to reach the dose desired value, the relative accuracy rises from about 5% for the conventional method to about 0.5% for the method with variable laser pulse energy. The number of laser pulses required however increases only by about $\alpha^{-1} - 1$, i.e. in this example from about 20 to 29 pulses. With the conventional method the accuracy of 0.5% can be achieved only with about 200 laser pulses.

Hereinafter examples of embodiment of the invention will be described in detail with the aid of the drawings, wherein.

Figure 1:
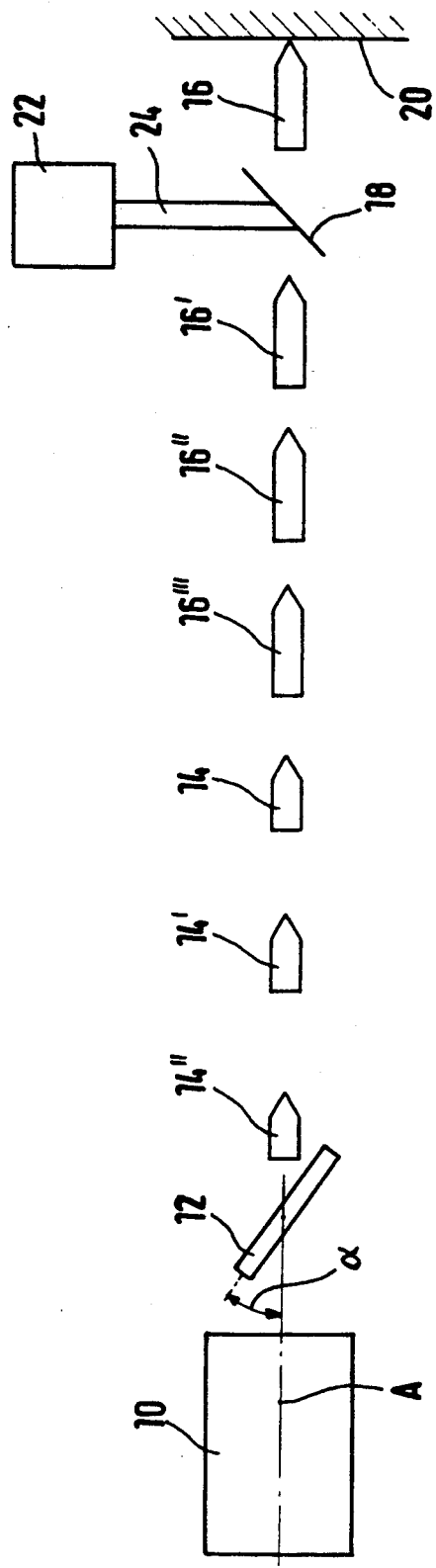
FIG. 1 shows schematically a laser with pulsed emission.

FIG. 1 shows a laser 10 emitting pulsed laser radiation on an optical axis A. The laser has first emitted pulses 16, 16', 16'', 16''' each having an energy amount E. Part of the emitted radiation is deflected at a semitransparent mirror 18 to an energy measuring device 22. The radiation (i.e. the greater part of the energy) passing through the semitransparent mirror 18 in the direction of the axis A is deflected onto a workpiece 20, for example for carrying out microlithography. The subbeam 24 deflected to the energy measuring device 22 contains for example 1% of the total energy.

After a corresponding proportion of the laser pulse 16''' has reached the energy measuring device 22 it is determined for example that 90% of the desired dose reference value $D_S$ has been attained. Thereafter the attenuator 12 is turned through an angle $\gamma$ with reference to the axis A in such a manner that the energy of each individual laser pulse is less than in the case of the pulses 16–16'''. This is indicated by the laser pulses 14, 14', 14'' drawn shorter. As soon as the further attenuated laser pulses 14, 14', 14'' etc. have accumulated an adequate energy amount corresponding to the dose desired value $D_S$ the laser radiation is interrupted or the workpiece 20 moved so as to operate at another point.

Instead of using the attenuator 12, the energy of the laser 10 can also be varied directly, in an excimer laser for example by adjusting the high voltage.

Figure 2:
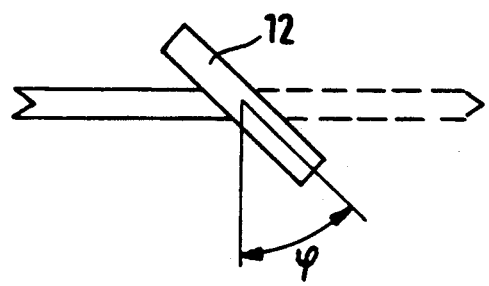
FIGS. 2A and 2B show a first example of embodiment of an attenuator and the transmission curve thereof.
Figure 2:
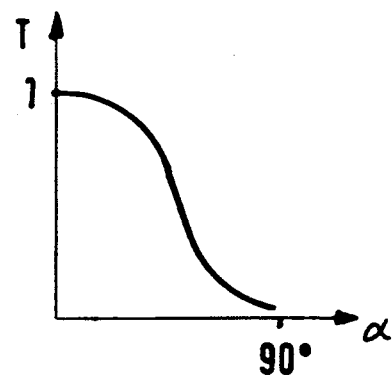

FIGS. 2A and 2B illustrate a rotating attenuator 12 having a transmission T which depends on the rotational angle $\gamma$.

Figure 3:
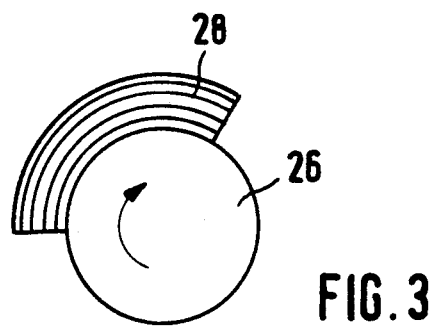
FIGS. 3, 4 and 5 show various embodiments of attenuators.

FIG. 3 shows an attenuator having a rotating disc 26 to which a filter segment 28 is attached having a transmission which is less than 1.

Figures 4, 5:
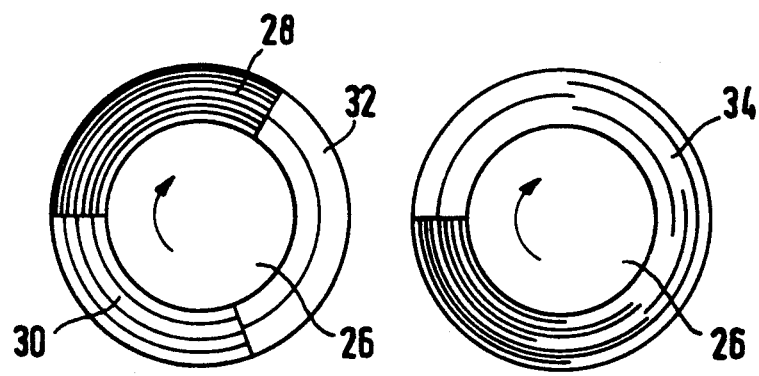

FIG. 4 illustrates a stepped filter having three different segments 28, 30, 32 of different transmission which can be arranged in the laser beam.

FIG. 5 shows an attenuator having a rotating disc and a filter 34 with continuously decreasing transmission.

The rotating attentuators are adapted in their speed of rotation to the pulse repetition frequency of the laser, the synchronization of the rotating attentuator with the laser pulse sequence being achieved for example by means of a light barrier.

I claim:

1. A method for accurately controlling to a desired dose value $D_S$ the accumulated energy of a plurality of successive laser pulses in a laser beam each having an energy amount E, comprising the steps of:
   (a) measuring the sum of the energy amounts contained in a first succession of said laser pulses until the measured accumulated energy has reached a selected value which is a relatively high percentage of said desired dose value $D_S$,
   (b) when the measured accumulated value has reached said selected value, attenuating the energy amount of said laser pulses to a fractional value of E, and
   (c) continuing to measure the sum of the energy amounts contained in said attenuated-energy pulses until the total measured accumulated energy reaches said desired dose value $D_S$.

2. An apparatus for accurately controlling to a desired dose value $D_S$ the accumulated energy of a plurality of successive laser pulses in a laser beam each having an energy amount E, comprising:
   (a) means for measuring the accumulated energy of a plurality of said successive laser pulses including means for generating a command signal indicating that the measured accumulated energy of a first succession of said laser pulses has reached a selected energy value which is a relatively high percentage of said desired dose value $D_S$; and
   (b) attenuator means arranged in aid laser beam and responsive to said command signal for reducing the energy amount of each laser pulse occurring thereafter to a fractional value of E and producing a second succession of laser pulses having an energy amount which is a fractional value of E which are measured until the measured accumulated energy reaches the desired dose value $D_s$.

3. Apparatus according to claim 2, wherein said attenuator means for reducing the energy amount of said laser pulses comprises a rotatable attenuator which varies the energy amount of each pulse as a function of the degree of rotation of said attenuator.

4. Apparatus according to claim 2, wherein said means for reducing the energy amount of said laser pulses is an attenuator comprising a rotating disk containing at least one filter segment.

5. Apparatus according to claim 4, wherein the rotating disc of said attenuator contains a plurality of different filter segments each for reducing by different fractional amounts the energy transmitted by the attenuator.

* * * * *